July 11, 1950 L. W. ALVAREZ 2,514,436
AIRWAY MONITORING AND CONTROL SYSTEM
Filed June 18, 1948 5 Sheets-Sheet 2

INVENTOR
LUIS W. ALVAREZ

ATTORNEY

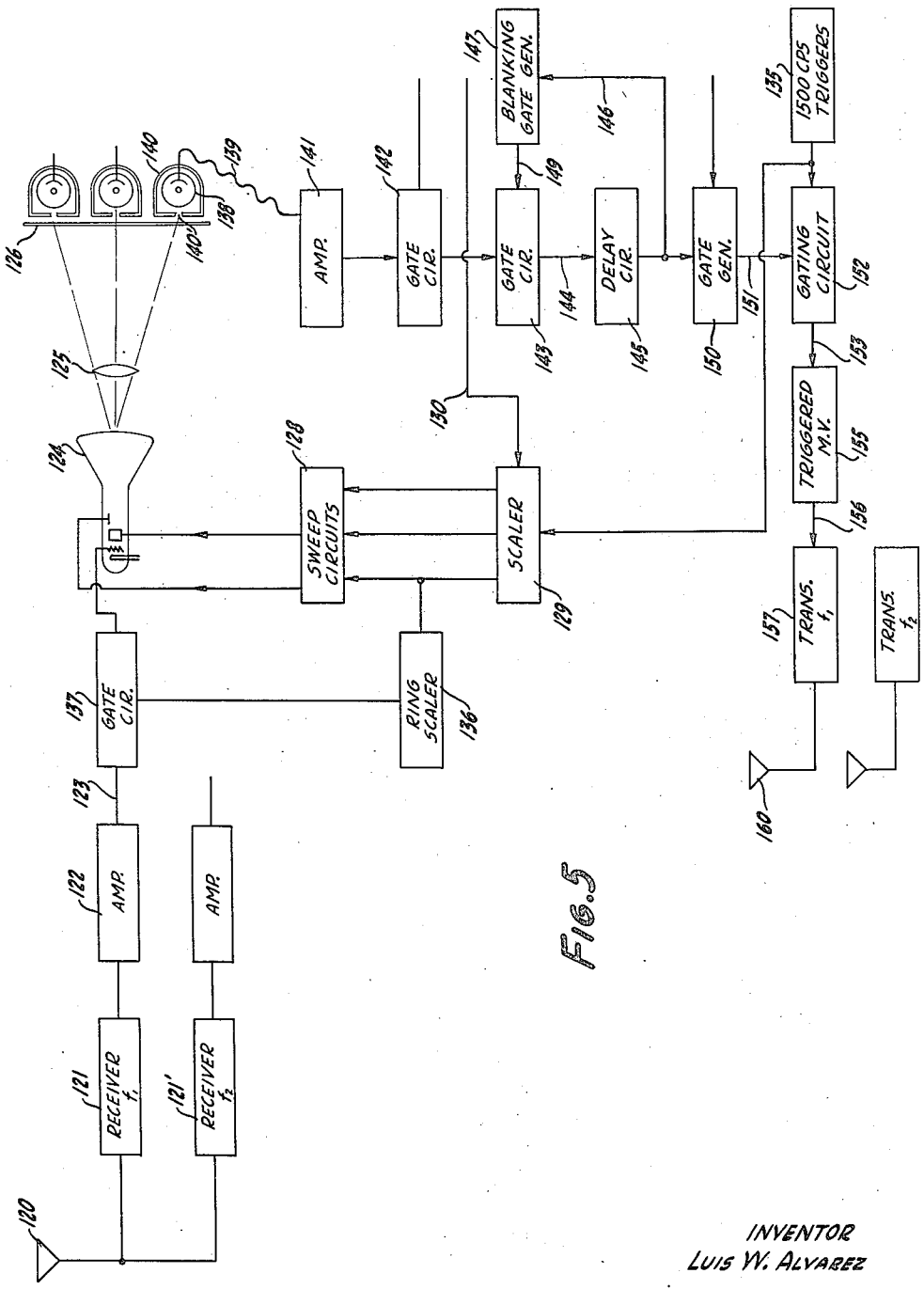

Patented July 11, 1950

2,514,436

UNITED STATES PATENT OFFICE 2,514,436

AIRWAY MONITORING AND CONTROL SYSTEM

Luis W. Alvarez, Berkeley, Calif.

Application June 18, 1948, Serial No. 33,804

21 Claims. (Cl. 343—101)

This application relates to systems for monitoring and controlling airway traffic, and is closely related to my copending application, S. N. 33,803, filed concurrently with this application, and entitled Radio Navigation System.

In the companion application mentioned I have described a navigational system wherein three radio transmitters are arranged at the apices of a triangle through which runs a division of the airway to be navigated or controlled. Such an airway comprises one or more traffic lanes or tracks in each direction, preferably divided by a barrier lane. One of the stations, which may preferably be the master station, transmits a characteristic pulse initiating a cycle of operation of the system, each cycle lasting for an arbitrary period which may be one or two seconds long. Each lane is subdivided into consecutively numbered sections, of some predetermined length such as one-half mile, and following the initial cycling pulse each of the three radio stations transmits a series of pulses characteristic of the transmitting station, these pulses being so timed as between the respective stations that successive pulses will arrive coincidentally at successively numbered sections along the airway, thus tracing out the lanes of the airway in succession.

Equipment on the planes navigating the airway detect the initiating pulse and the occurrence of a coincidence, and, either by counting the pulses following the initial cycling pulse up to the time when a coincidence occurs, or by measuring the time between the initiating pulse and the occurrence of a triple coincidence, indicates which numbered section of the airway the plane is occupying at the instant the triple coincidence is received, thus definitely defining its position.

As thus described, the system of my copending application gives to the pilot of an airplane the information that he needs to fly a preselected track and to remain on that track. It makes no provision for informing a dispatcher or controller as to whether or not the pilot is following the flight plan outlined before he starts, or for giving to him instructions to change lanes, or take any other action which may be necessitated by the exigencies of other traffic along the airway.

The purpose of the present invention is to fill these gaps so as to present a complete navigational control and monitoring system as well as a navigational system, utilizing the timing and triple coincidence mechanisms to convey to the dispatcher necessary information as to the plane's whereabouts, and to transmit to the pilot any necessary changes in orders or other instructions.

Among the objects of this invention are to provide a system of airways monitoring and control which will:

(1) Indicate graphically, at a control center, the lane, the position on said lane, and the altitude of each airplane flying the airway;

(2) Identify the plane flying in any specified position;

(3) Indicate to each pilot the presence of a plane within some predetermined "danger distance," either ahead of or behind him in his lane and flying at his elevation, disregarding signals from all other planes with which there is no danger of collision, this constituting, in effect, a block system which moves with each plane;

(4) Transmit to any plane occupying any predetermined position upon the airway coded warnings, information, or orders, including orders to communicate with the control station by voice if this be desired;

(6) Automatically notify the control station that such an order or information has been received; and (7) Accomplish the foregoing on a minimum frequency channel.

Other objects and advantages of this invention will be mentioned or become apparent in the course of the following specification, taken in conjunction with the drawings, wherein:

Fig. 5 is a block diagram of the circuits and equipment used at the control center for displaying the information transmitted from the various planes on a dispatch board at such center, and for transmitting to the plane, in response to the signals received therefrom, necessary orders or information;

Figure 1:
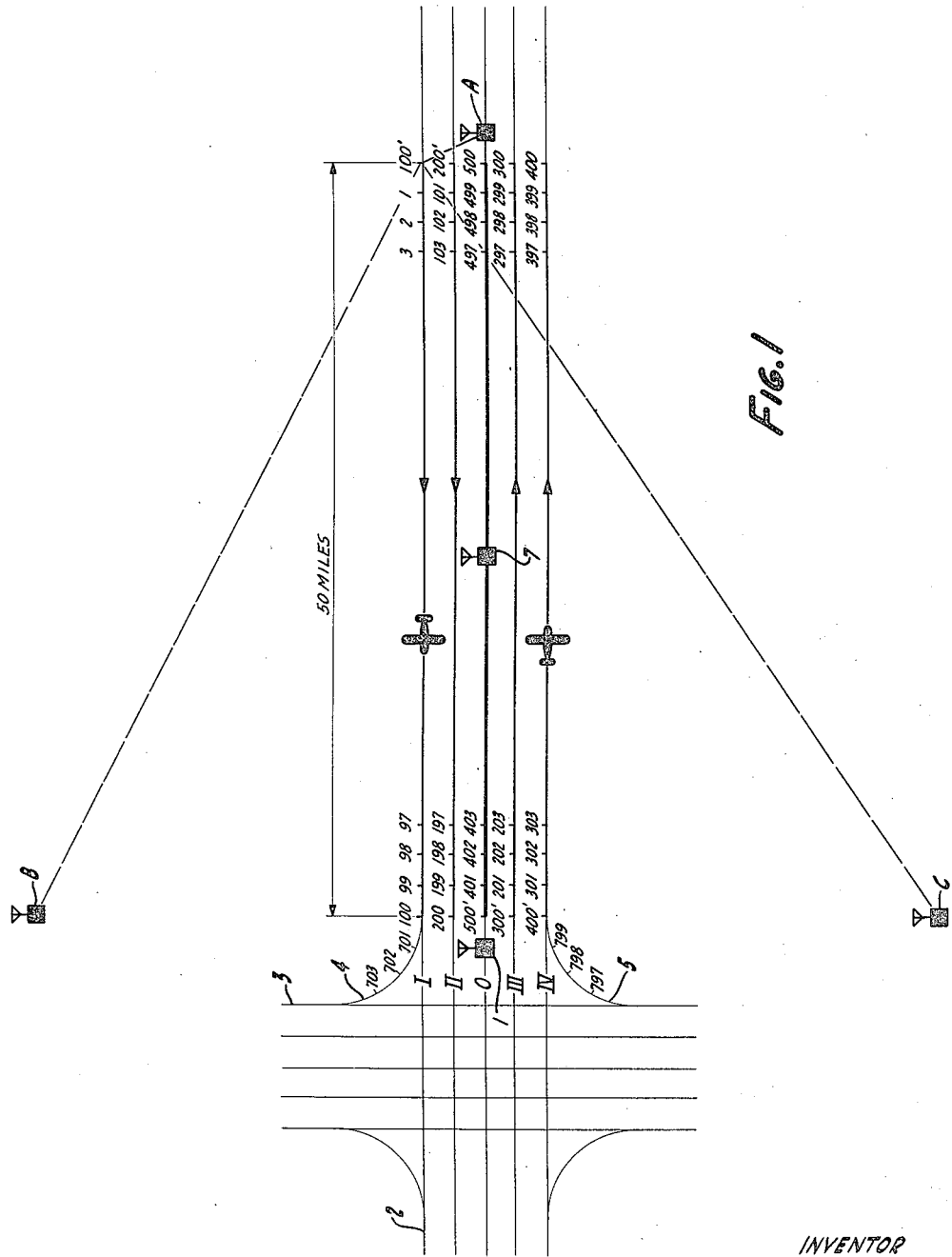
Fig. 1 is a schematic representation of an airway division and its radio transmitters and control station laid out in accordance with the system of this invention.

The somewhat idealized airway illustrated in Fig. 1 comprises two west-bound tracks, I and II, and two east-bound tracks, III and IV, separated by a barrier track 0. The portion of the airway illustrated consists of a single division, of fifty miles length, and the tracks are separated by a distance of two miles; the lines in the diagram indicate the "true course" down the center of each track, so that any plane flying any of the tracks may wander one mile to either side of the true course without danger of interference or collision from planes on adjacent tracks. Each track is divided into sections, which are assumed, for purposes of description, to be one-half mile long. The sections are numbered from 0 to 100 along track I, from 101 to 200 track II, etc., the numbering in each case starting at the beginning of the track, so that the sections run from east to west in tracks I and II, while the numbering starts from the west and runs east on tracks III and IV. As the division shown is supposed to be intermediate between like divisions to east and west, section point 0 coincides with section point 100 of the preceding division, this point is therefore identified on the drawing as 100'. Similarly, track II ends with point 200, but begins with point 200', corresponding to the end of the preceding division. The barrier lane 0 might be considered as running in either direction, but is arbitrarily taken as running from west to east. The section point numbers on the drawings merely indicate this order; the sections are not to the scale of the remainder of the drawing.

The division shown runs through the center of a sixty-mile equilateral triangle defined by a master radio station A at one apex, and slave stations B and C at the other two. Station A is indicated as being on the line of track 0, while stations B and C are equally spaced on either side of the other end of the division. As is pointed out in my copending application, it is not necessary that the triangle be equilateral, although it is shown that way for simplicity.

In some cases there is an advantage to be gained by moving the master station A farther away from the end of the airway; in other circumstances it may be advisable to move it to one side. It is always preferable, though not absolutely necessary, that the slave stations be equally spaced from the airway at its other end, although they need not be precisely at the end of the airway as shown.

At the western end of the airway, i. e., at the end opposite to that at which the master station A is located, is a control station 1 at which is located the ground equipment to be hereinafter described. This control station can also serve the airway division generally indicated by the reference character 2, to the west of the division herein to be described in detail. If desired, such a control station may also serve for a transverse airline, such as that indicated by the reference character 3, shown as running north and south, and connected to the division under consideration by turnouts 4 and 5.

Midway between the master station A and the control station 1 there is indicated a relay station 7. Such a station may or may not be required, depending upon the method used for holding the entire system in synchronism. The presence of the relay station indicates that it is here considered that the synchronization of the entire system, consisting not only of the primary division, but also of other divisions within the same major zone or area, would be held in step by a microwave radio link. In this case synchronizing signals could originate either at the master station A or at the control station 1 or in some similar locality farther along the line. If originating at station A the microwave synchronizing signals would be transmitted to the relay station 7, thence relayed to the control station 1, and from there be transmitted to the two slave stations B and C. Other methods of synchronization would be by means of the cycling signals from station A, as in the Loran method of navigation, or by land-line. In any event, the time of propagation of the signals, whether by radio or by land-line, must be taken into consideration, and the various stations properly phased with respect to station A so as to send their signals at the proper epochs of each cycle.

The simplest method of operation of the system is to send out from station A a uniformly spaced series of pulses characteristic of the master station following a pulse of different character indicating the beginning of the cycle. In the companion application it is suggested that the cycling pulse be a pulse of fifteen microseconds' length, and that the succeeding pulses each be six microseconds in length emitted at intervals of 1/1500 second, or 666⅔ microseconds' length. Unles otherwise indicated, the word "intervals" as hereinafter used will refer to these 666⅔ microsecond periods. The interval between pulses is adopted to permit the pulses from the master station to clear the slave stations in all cases before the latter transmit their signals corresponding to the succeeding point on the airway, since otherwise false coincidences may occur. It should be noted, however, that signals from the master station can themselves be jittered, as are the signals from the slave stations, but this results in unnecessary complication of the system and is not recommended.

The companion application discloses fully a method of jittering the times of emission of the signals from the slave stations so that there will be coincident arrival of the waves from all three stations successively at the successively numbered points along the airway. It is also shown in that application that the triple coincidence which defines each section of the airway need not be absolute in time, but that it may be delayed; i. e., that the equipment on the plane may be so devised as to recognize signals, arriving in a definite predetermined pattern following the arrival of the signal from the master station, as being a "coincidence," this arrangement permitting use of a single frequency of transmissions from both master and slave stations. The use of three different frequencies from the three different stations, and an absolute coincidence in time, may also be used, but is less economical of frequencies. In view of the description in the companion application the mechanism for accomplishing either of these results will not be redetailed here, the present application being devoted to the monitoring and controlling equipment as distinguished from the navigational equipment proper which is covered by the other application.

From the foregoing it will be understood that the master station A emits its long (15 microseconds) cycling signal, followed by interval signals of 6 microseconds' length every 666⅔ microseconds thereafter. Signals defining each section of the 500 constituting the airway division will therefore be transmitted in one-third of a second, and the remaining two-thirds of the second, if a one-second cycle be chosen, may be devoted to adjacent airway divisions.

If the cycle be two seconds long, five additional airway divisions or four additional divisions plus turn-outs, holding courses, etc., can be accommodated within the cycle, and from an operational standpoint it is probably desirable that a two-second cycle be used where the control mechanisms contemplated by this invention are to be used. A plane at any point of the airway will receive a triple coincidence at some time within the cycle, and the number of intervals counted by it between its receipt of the cycling impulse and the triple coincidence will indicate to the plane its position on the airway. Thus a count of 174 would indicate to a plane registering a triple coincidence at such a count that it had proceeded thirty-seven miles along track II (west-bound) from the beginning of the division. If the time division method here recommended be used, and the plane were on the second division of the airway, instead of the first, a like position along that division would be indicated by a count of 674. As is described in the companion application, and as will hereinafter later be shown, these positions can be indicated directly, so that no translation from counts to distance flown or to be flown is necessary on the part of the pilot.

In accordance with the present invention the registration of a triple coincidence by the airborne equipment not only indicates to the pilot his position on the airway, but also triggers circuits, which (a) transmit a pulse indicating that a plane is in a position on the airway defined by the immediately preceding coincidence; (b) indicate by the characteristic of the pulse transmitted, either frequency or pulse-coding, the altitude level at which the plane is flying; (c) open a receiver gate which remains open for a sufficiently long period to receive like signals from a plane within danger distance ahead (for example, six miles) and if such signals are received, give a warning light; (d) follow the annunciator signal by an identification code transmitted during the period when the receiver gate of a plane either in front of or behind it would still be open, thus indicating by either fixed or flashing lights the presence of a plane in front of or behind it; and (e) transmit a "signal received" or "automatic roger" signal if additional signals are received from the ground during the period when its gate is open.

The ground equipment at the control station includes a display surface or dispatch board or boards schematically representing the airway division, separate lines along the board being allotted to the different lanes of the airway, and to the different levels in each lane.

The board or boards are swept or scanned in synchronism with the travel of the position-defining impulses along the airway, and the receipt of the annunciator signal from the plane is indicated by illumination of the schematic tracks on the board at the position on that track corresponding to the section of the airway from which the plane sends its annunciator signal. A plane on the airway will thus indicate its position on the dispatch board in each cycle of operation of the system; in the selected cycles of the operation wherein the plane sends its identification code, this code will be indicated by a train of points whose arrangement establishes the plane's identity. The arrival of an annunciator signal also serves to cause the control station to transmit any of a preselected group of possible code pulses constituting an order to the plane occupying that particular position on the airway, and since only a plane in that position will have its receiver gate open, the order is received by that plane alone. The automatic roger transmitted by the plane upon the reception of such an order is also registered upon the dispatch board.

In order to give a detailed description of equipment which will operate in accordance with the invention, it is necessary to make certain assumptions as to the airway system on which it is to be used, and the conventions adopted as standard. For the purposes of this description it will therefore be assumed that a two-second cycle of operation has been standardized upon, the time in the cycle being shared by six airway divisions, or parts of divisions.

The frequency of transmission of the section-defining pulses from the master station is taken as 1500 cycles per second, or an interval of 666⅔ microseconds. It is further assumed that the length of the blocks, within which a warning is given of an adjacent plane, is six miles; that is, that the airway will be operated with no planes in the same lane and upon the same level with a separation of less than six miles. The planes will transmit their identification signals, as distinguished from a mere annunciator pulse, every ten seconds, or every fifth cycle of operation of the system.

It will also be assumed that differentiation as between the various levels of the airway will be by frequency. It is to be understood that none of these conventions is essential to the operation of the system. The development of radar responder beacons, and of remote control radar displays, has familiarized technicians with many methods of coding and decoding signals, by time division, pulse patterns, and pulse lengths, as well as frequency. One of the advantages of the present system is that any of these methods may be applied to almost any of the elements of the system, and because of this the various coders, gating systems, and the like, are not described in detail, since they would vary in accordance with the conventions finally adopted, and they are all well known per se.

Figure 3:
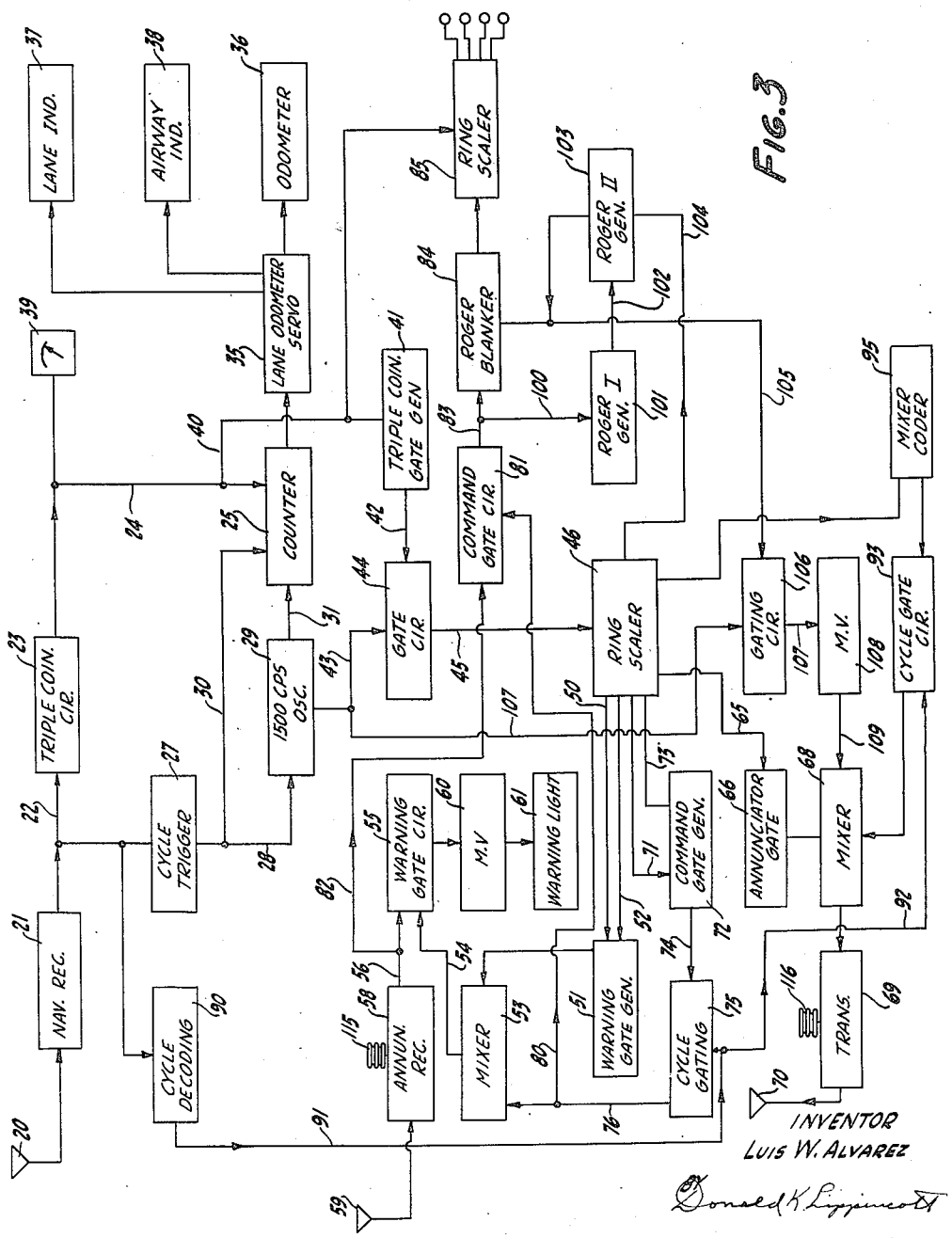
Fig. 3 is a block diagram of the air-borne equipment adapted to transmit to the control station the signals which will convey to the control office the information as to position and altitude of the plane, and to indicate to the plane's pilot the orders or information transmitted from the control center.

Fig. 3 is a block diagram of one organization of the air-borne equipment designed to operate in accordance with the system of this invention. In accordance with this diagram the signals from the master and slave stations A, B and C are picked up by an antenna 20 and passed along to the navigation receiver 21, which passes the detected signals through line 22 to a triple coincidence circuit 23, this circuit being described in some detail in the companion application referred to. The occurrence of a triple coincidence initiates an impulse which passes through the line 24 into a counter 25.

The cycling pulses, occurring every two seconds, are also picked up by the antenna and passed through the receiver to a cycle trigger 27. This trigger recognizes only the fifteen microsecond pulses starting the cycle, and upon its recognition of such pulses it passes an impulse along a line 28, which serves to phase a 1500-cycle oscillator 29. The same impulse passes through a branch circuit 30, and zeros the counter 25. The oscillator 29 transmits its 1500 cycles-per-second impulses through a line 31 to the counter 25, which therefore, after having been zeroed by the cycle trigger 27, counts these impulses until its action is stopped by the arrival of a triple coincidence along line 24.

The counter 25 is described in my companion application as comprising first, a scale-of-two stage indicating half-mile sections; second, a scale-of-ten, indicating miles traversed (or to be traversed) along the course; third, a scale-of-five, indicating tens of miles along the fifty-mile division; fourth, a scale-of-five, indicating the successively numbered tracks along the division, from zero to IV; and finally a scale-of-three, indicating the three divisions of the airway in the cycle there described. In the present case the final scale would be a scale-of-six, since in this case a two-second cycle has been assumed. In the companion application the counts registered by the counter 25 are transferred through a clamping circuit to individual lights registering the various factors included in the count. Here the counts are shown as being transferred to a lane odometer servo 35, which actuates an odometer 36, a lane indicator 37, and an airway indicator 38. The right-left indicator 39 is actuated directly from the triple coincidence circuit 23. These various navigational instruments are not described in detail, since they are only incidental to the subject matter of the present application.

The annunciator and command equipment with which this application is particularly concerned has its operation initiated by the triple coincidence pulse, which is taken off of line 24 through a branch line 40, and fed into a triple coincidence gate generator 41. The gate generator can be a circuit of the "one shot" multivibrator type, which, when triggered, goes through a single cycle of operation and then resets itself to await another pulse. In the present case the gate generator develops a square wave, the duration of which is equal to a trifle over fourteen cycles of the 1500-cycle oscillator 29, i. e., fourteen intervals, so that fifteen pulses from the generator will always be included in the gate, whatever its phase of opening.

Figure 4:
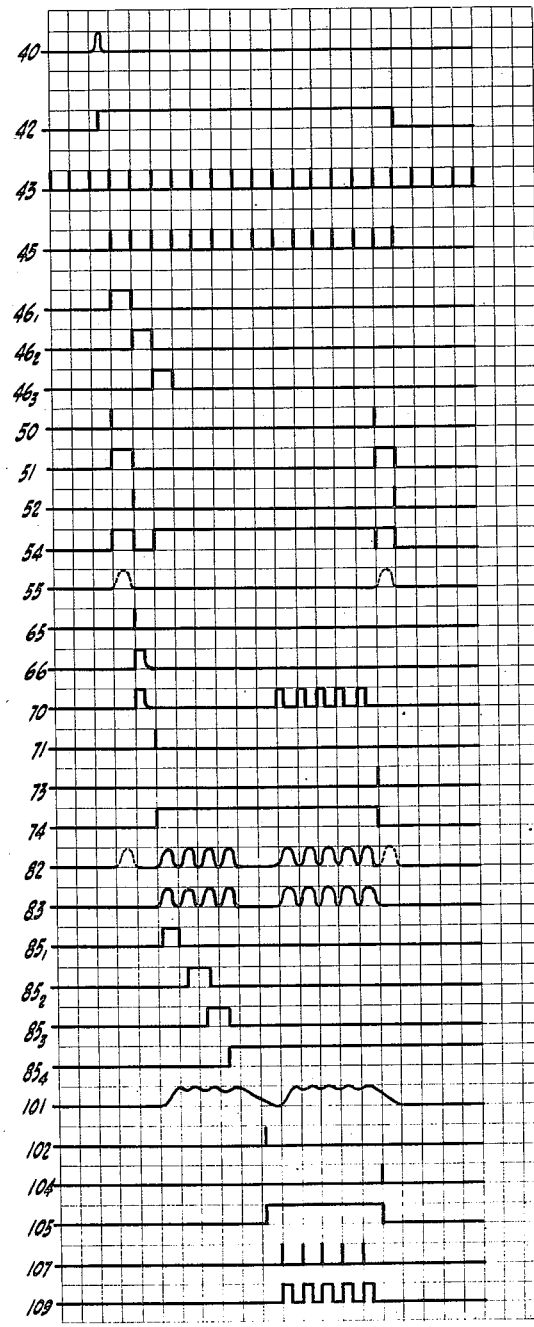
Fig. 4 is a series of graphs, showing the waveforms or impulses existing in the various circuits indicated in Fig. 3, and the time relationship thereof, all of the wave-form graphs being plotted to the same time scale.

The relationship between the triple coincidence pulse and the gate which it triggers, as well as the currents, impulses, etc., later to be described, are illustrated in Fig. 4. In this figure, all of the graphs are plotted to the same time scale, starting from the same zero. For convenience, each graph is numbered with the same reference character as the circuit which carries the current depicted by the graph, and cross-reference between the block diagram and the graphs is recommended in order that the operation of the equipment may better be understood.

The oscillator 29 generates a continuous series of short sharp pulses, which are fed into line 43, leading to the gate circuit 44. Until the gate in this circuit is opened by the gate generator impulse from the line 42, none of these impulses go further along this line, but the operation of the gate permits fifteen of these impulses to pass before it closes. These fifteen impulses are fed through a line 45 to a ring scaler or counter 46.

The scaler 46 comprises fifteen stages of the well-known type wherein each stage consists of two sets of tube elements (which may either be fifteen double tubes, or fifteen pairs of tubes), one set of elements of each pair being normally conducting and the other set being normally non-conducting. Some one of the normally non-conducting tubes, however, is always conducting; the receipt of an impulse by the scaler trips this tube, which actuates the next "normally non-conducting" tube in the ring. The receipt of the next pulse passes this action on around the next stage of the ring, so that, when fifteen pulses have been received, the scaler has "counted around" and is left in the condition in which it started. Thus, by connection to either the normally conducting or to the normally non-conducting tube in each stage, square pulses can be developed during any of the fourteen intervals defined by the fifteen pulses which are passed by the gate. The nature of the pulses from the first three tubes of the ring is illustrated in graphs 46$_1$, 46$_2$, and 46$_3$ of Figure 4. The leading edges of these pulses can be differentiated, and passed through the various circuits to start or stop any of the various functions required by the equipment at the proper epoch of the cycle during which the gate 44 is open. As stated above, such scalers are well known; they may be constructed with any number of stages. Decade and binary types, for example, are described in the Proceedings of the IRE for August 1947, pages 757 to 760.

The first impulse from the ring scaler 46 is sent through a line 50, which is so connected that impulses transmitted along it open a warning gate 51. The fourteenth impulse from the scaler is also transmitted along this same line. The second and fifteenth impulses are transmitted along line 52, connected to trip off the warning gate generator 51. These connections are permanent, so that gates are always generated during the first and fourteenth cycles of the 1500-cycle oscillator 29, following a triple coincidence. The warning gates thus generated are passed in a mixer 53, wherein they may be mixed with other gatings, and thence are passed through a line 54, to the warning gate circuit 55.

It may be noted here that the gate generator 51, as well as other gate generators hereinafter referred to, may be bi-stable multivibrators of the same general type as comprise a binary counter. Such generators are widely used in radar practice, and several forms are described in "Waveforms", vol. 19, Radiation Laboratory Series (McGraw-Hill), page 164 et seq. The gate circuit 55 and other similar circuits later referred to may be of almost any of the types described in chapter 10 of the same work, page 364 et seq.

The gate 55 is connected in the output circuit 56 on annunciator receiver 58 which is tuned to receive annunciator signals as picked up by its own antenna 59. As will become apparent from the equipment next to be described, the opening and closing of the warning gate coincides with the transmission of annunciator signals from planes six miles behind or six miles ahead, respectively, of the plane carrying the equipment here described. If such signals are received they are passed through the gate 55 to a "one shot" multivibrator 60. This turns on a warning light 61, which remains on for just under two seconds, when the multivibrator flips back, extinguishing the warning light just before another triple coincidence at the other plane is due to occur. If, at this time, another annunciator signal is received it will relight, giving a substantially continuous signal, but otherwise it will extinguish at the end of the cycle.

The gate 55 always closes during the second 666⅔ microsecond interval, and during the time in which it is closed the equipment sends out its own annunciator signal. This is accomplished by a pulse taken from the second stage of the ring scaler 46, and transmitted through line 65 to an annunciator generator 66. The latter generator develops a pulse which may be about 300 microseconds long, and is transmitted to a mixer 68 from which it passes to the annunciator transmitter 69 and is radiated from a transmitting antenna 70 to indicate the position of the plane to the control station and to any plane which may be within six miles behind it.

Returning to the ring scaler 46, the third pulse which it generates is passed into a line 71, leading to a command gate generator 72. The command gate remains open until it receives a pulse from the fourteenth stage of the ring scaler 46, transmitted through line 73. The pulse thus developed is transmitted along line 74 through a normally open cycle-gating circuit 75 and thence into a line 76 which feeds mixer 53, and thus serves to open the warning gate circuit 55 so that the warning gate is open and the warning light 61 is operated, when a command is received as well as when there is a plane within the block or danger distance and less than six miles ahead.

A branch line 80 from line 76 leads to a command gate circuit 81. Command signals, received by the annunciator receiver 58, are also fed into the command gate circuit through a branch line 82, from circuit 56. Signals passed by the command gate are transferred through a line 83 and a roger blanker 84 (which operates to block this circuit when a command is being responded to as hereinafter described) to a ring scaler 85.

Figure 2:
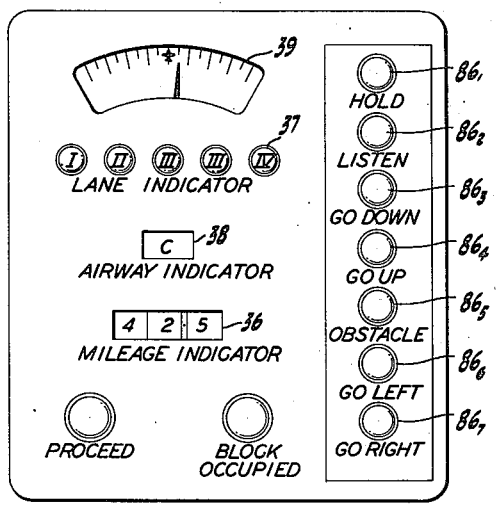
Fig. 2 is a front view of an aircraft indicator adapted for use in connection with this invention.

The latter is an eight-stage device, in the present instance, to transmit seven different commands, the eighth stage being the "off" or zero command. The commands received consist of from one to seven pulses, which are counted by the scaler, and serve to light the lamps identified in Fig. 2 as 86₁ to 86₇, inclusive. A single pulse received by the command circuit would instruct the pilot to take a holding course, two pulses would instruct him to listen for telephonic instructions, three to occupy the next flight level below, four the next level above, five would indicate an obstacle which should be watched for (this might mean to look for curvature in the airway), six would instruct him to take the next lane to the left, and seven the next lane to the right. The scaler is reset to zero once in each cycle by the triple coincidence pulse derived from line 40.

According to the assumption set forth above, each plane would be required to send out its own identification signal in every fifth cycle of operation of the system, or, in other words, every ten seconds. It could easily be arranged that this be initiated through equipment borne by the plane, but it appears desirable that all identifications be transmitted during the same cycle of operations, in order that spurious signals might not be transmitted and received by other planes and thus confuse matters. Therefore, it is preferred that the identification signals be triggered off by signals transmitted from the ground. This is accomplished by an auxiliary pulse transmitted by the master station immediately following the cycling pulse. Both the regular fifteen microseconds cycling pulse, and the auxiliary pulse, are fed to a cycle decoder 90 which identifies the combination received and responds by pulsing line 91 positively until turned off by the next cycling trigger. This pulse is transmitted to the cycle gating circuit 75, where it is inverted and cuts off the impulses from the command gate generator 72 for one entire cycle of operation. The purpose of this is, of course, to prevent the identification signals as transmitted by the plane carrying the equipment from paralyzing the receiver circuit, and from giving false commands or warnings.

The cycle gate wave is also fed through a branch circuit 92 to the cycle gating circuit 93, opening the gate in this circuit. In the meantime, pulses corresponding to the code assigned to the plane carrying the equipment are transmitted from the ring scaler 46 to a mixer-coder 95, from which they pass through the gate 93, into mixer 68, and are transmitted as in the case of the annunciator signals.

With the setup as here described it is important that each identification code transmit the next-to-the last pulse from the scaler in each cycle. If this is done there will always be a pulse transmitted which will be received by a plane six miles ahead during the period that the receiver gate is opened by the first pulse from the ring scaler. This final pulse of the code will, therefore, operate the warning light 61, on the plane ahead, so that the light will remain on for two seconds, and then remain off for the succeeding eight seconds until the next identification signal is sent. It follows that a plane within danger distance in the rear will be indicated by the flashing of a warning light for two seconds out of every ten, whereas a plane ahead, which the following plane must avoid, is indicated by a warning light which operates continuously as long as the plane is within the six-mile ahead block. In other words, warning is received of a plane ahead each time the annunciator signal is operated, whereas a plane behind is indicated only during the periods of identification, or (should it come nearer than six miles) when it is transmitting a signal as next described.

It would frequently be desirable to have an indication at the control station that a command had been received. Such an automatic roger can be achieved by taking off from the output of the command circuit gate a branch circuit 100 leading to a first roger generator 101. This comprises an integrating circuit having a relatively rapid build-up and slow decay, as, for example, by charging the timing circuit of a multivibrator or blocking oscillator through a diode and permitting it to discharge through a high resistor, as is common in television and radar practice, thus generating a wave form of the character indicated in the graph 101 of Fig. 4. The decay of this potential trips the multivibrator or oscillator and generates a single pulse in line 102, which is carried to the second roger generator 103. The latter can be a flip-flop circuit which generates a gating pulse lasting until it is flopped by the last pulse from the ring scaler 46. The time constants of the two sides of the circuit are made unequal, so that it recovers promptly after receiving the pulse from roger generator I, 101, and is ready to respond to the terminating pulse from the scaler, but its recovery from the latter pulse is made very slow, and it is not reoperated by a second pulse from generator 101 caused by the roger signal itself.

The pulse from roger generator II, 103, operates roger blanker 84 to prevent the roger from operating scaler 85, and is also transmitted through channel 105 to gating circuit 106, where it permits the passage of impulses direct from oscillator 29 through channel 107. These excite a multivibrator 108 which feeds its impulses through channel 109 to the mixer 68 and thence to the transmitter, as in the case of the annunciator pulses. The roger blanker is simply an inverted gate circuit of the character already referred to, i. e., the biases are such that the gate is normally open and the gate tube is biased to cut off by the pulse from the generator 103.

The command gate is open for eleven interval pulses. The roger generator I requires two intervals to operate. The roger therefore consists of 9-n pulses, where n is the number of pulses in the command signal, and hence indicates what command has been received.

Different levels on the same track, and on the same section, may be occupied simultaneously by different planes without danger of collision, and it is important, both for command and for identification purposes, that there be no confusion between two planes in this situation. This can be accomplished in a number of ways. The annunciator and command frequencies may be assigned different sub-channels for different altitudes; all systems now considered contemplate the use of ten different flight levels, and there is ample room in a microwave or ultra-high frequency channel such as would here be used to take care of ten such frequencies. It is also possible to utilize time division methods or pulse coding methods to distinguish between altitudes. At the present time I prefer the sub-division of frequency method of distinguishing between altitude levels, and accordingly I have indicated on both the annunciator receiver 58 and the transmitter 69 aneroid capsules 115 and 116 respectively for automatically tuning the transmitter and receiver to the frequencies assigned to specific levels. It is understood that these barometric devices change the frequencies by discrete steps as between the ten flight levels contemplated, and that each flight level would have a tolerance of, say, plus or minus 1000 feet.

Fig. 5 shows in block form the organization of apparatus at the ground for showing on a dispatch board the positions, identifications, and responses of planes at one altitude on the division of the airway here depicted.

Figure 6:
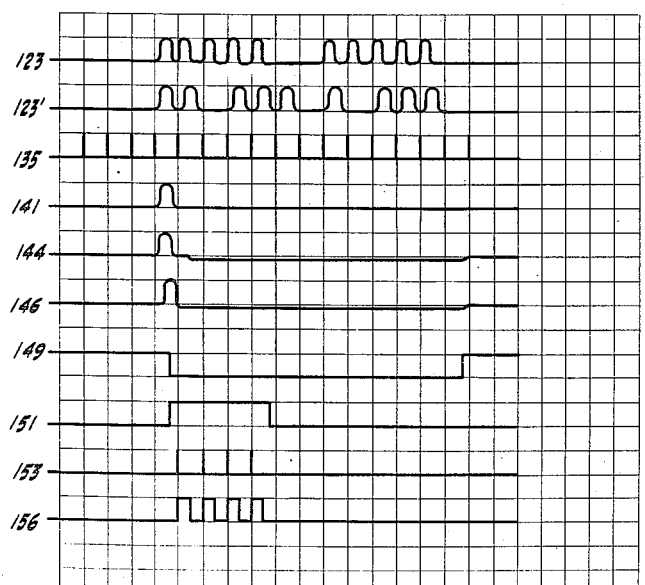
Fig. 6 is a series of graphs, similar to that of Fig. 5, indicating wave-forms and positionings in the various circuits indicated in Fig. 5.

Fig. 6 is a series of graphs similar to that in Fig. 4, showing the wave forms developed in the like-numbered circuits of Fig. 5.

In the layout here shown the annunciator and other signals from all of the planes on the division are received on a single wide-band antenna system 120, which feeds into the various receivers 121, 121', etc., ten such receivers being provided for the entire system. It would, of course, be possible to provide a separate antenna for each receiver, but this is an obvious modification. The received signals are fed into an amplifier 122 and thence through a circuit 123 which applies them to the grid of a projection-type cathode ray tube 124. In the graphs of Fig. 6, 123 indicates the annunciation signal and the identification code as they appear in channel 123; 123' indicates a command and roger in the same channel. This tube should preferably have a fluorescent screen of the persistent type, such as is used in P. P. I. radar equipment, so that the signals impressed upon it persist for a considerable period, i. e., over two seconds. A projection system, symbolized by the lens 125, projects an enlarged image of the cathode ray screen upon a translucent dispatch board 126.

A deflection system is provided for the cathode ray beam by a sweep-circuit generator 128, which may be of the type familiarized in television practice, except for their periods; the horizontal sweep should have a period of one-fifteenth of a second, whereas the vertical sweep has a period of one-third second. With this arrangement the beam will trace five lines across the screen in each one-third second interval, and the vertical sweep should be of sufficient amplitude so that there is a relatively wide separation between the lines, each one of which symbolizes one of the tracks upon the airway division. With this arrangement each track will slant quite steeply, but this is of no real importance; if desired, however, the vertical deflection may be accomplished in steps so that the traces of the beam are horizontal instead of sloping, but this is a matter of mere detail.

A still further refinement in the sweep circuit arrangement is to reverse the direction of the sweeps as between east-bound and west-bound lanes; if all the lanes in one direction are swept out first and then the lanes in the opposite direction, this is done by electronically switching the deflecting circuits; if lanes are swept alternately in opposite directions straight-line symmetrical (triangular) wave forms are used. Both the electronic switching and the generation of the symmetrical waves are known in the art and are therefore not described in detail.

The sweep circuits are held in step by pulses transmitted from a scaler 129. The scaler is reset in each cycle of operation by the starting trigger signal transmitted from the master station and received over line 130. The scaler counts 1500-cycle impulses generated by an oscillator 135, and is set to transmit to the sweep circuits a vertical synchronizing pulse each one-third second, and a horizontal synchronizing pulse each one-fifteenth second, i. e., on the five-hundredth and fifteen-hundredth pulses received from the oscillator 135.

If desired, the sweep circuits can be blanked during all except the one-sixth of the operating cycle in which the division to be controlled is being swept. I prefer, however, to permit the sweep circuits to operate continuously, and to feed the vertical deflecting pulses from the scaler 129 into a ring scaler 136 of six stages, which is connected to open a gate circuit 137 in the one-sixth of the cycle devoted to this particular division.

The arrangement described will sweep the dispatch board in synchronism with the sweep of the division by the section identifying signals. Because, however, the annunciator signals are delayed by two section intervals following the receipt of a triple coincidence, the sweep circuits are also so phased as to delay the sweep of the dispatch board by this amount. If this is done, the modulation of the cathode ray beam by the annunciator signals will cause a bright spot to appear upon the board in a position corresponding to the position of a plane on the track schematically corresponding to the position of the plane.

Various other types of display surfaces or dispatch boards can be used. It is not necessary that a projection tube be used; a large tube can be used directly without projection, and the equipment yet to be described can be utilized with such a tube. It is also possible to use banks of neon lights, arranged in rows to indicate the various tracks on the airway. In this case the lights can be successively switched into circuit, and be lighted by the reception of the annunciator pulse. Such arrangements are, however, so complex in comparison with the cathode ray method of display, that I believe their use would be uneconomical, even though such arrangements are quite feasible from a technical point of view.

The identification signals transmitted by any plane, and the roger transmitted in acknowledgement of a command received by a plane, also appear upon the display board, being spread out as spots of light over a length of track upon the board corresponding to six miles. In any normal operation this should never interfere with the annunciator signals or other transmissions from a second plane. The whole idea of the six-mile warning to the pilot of a plane is as a secondary line of defense. It is the purpose of the control and monitoring system, and the use of the dispatch board, that if a plane is overtaking or being overtaken by a second plane in the same elevation on the same track one or the other of these two planes should be transferred to another level or to another track. This is one of the principal reasons for the command channel provided by the system.

The receiver gate on the plane being controlled is open during the interval corresponding to this six miles, and it is ready to receive a command in the cycle immediately following its transmission of its annunciator pulse, and for thirteen intervals thereafter. A transmission of the command, therefore, must be very accurately timed within the intervals allotted to its transmission, and this may be accomplished by the remaining equipment of Fig. 5.

While many methods of causing the annunciator pulse to intiate a command signal are available, an analysis of the operations and equipment required indicates that an apparently crude method is probably the best.

In this arrangement one or more photocells 138 are provided, behind the translucent display surface, each connected by flexible cord 139. The photocell is provided with a light protective housing 140, in which is formed a narrow slit 140'. When it is desired to transmit a command to a plane in a particular section the control operator simply holds the tube up to the board with the slit in register with the position thereon corresponding to that section. As a 300 M. P. H. plane will occupy each section for six seconds there is example time to do this, while adjusting permanently mounted cells on tracks, and other mechanical registering devices, all require more manipulation and take more time. Tubes for transmitting permanent orders, such as obstacle warnings, can, of course, be permanently fixed in place on the board.

With the tube 138 held in place with respect to a selected section, the annunciator pulse from a plane entering this section will cause a 300 microsecond pulse to be transmitted to an amplifier 141, which passes it on to a gate circuit 142. This gate circuit is closed during every fifth cycle of operation by the cycle gating pulse sent out by the master station as an auxiliary to the starting trigger pulse, so that the command will not be sent during the cycle in which the identification signals are transmitted from the planes.

It should be noted that as the pulses appear on the screen to the eye they last much longer than the 666$^2/_3$ microseconds, owing to the persistence of the screen. Even persistent screens, however, flash much more brightly while excited, thus giving a light pulse during this interval, and as a D. C. amplifier is not used the persistent portion of the trace is not passed by it.

From the gate circuit 142 the signal is passed on through a second gate circuit 143, and thence through a line 144 to a delay circuit 145 which delays the pulse just long enough so that the circuit is not self-blocking and then passes it on through a line 146 to a blanking gate generator 147. This passes a twelve-interval gate through line 149 back to the gate circuit and prevents an immediate repetition of the command signal, or a stretching out thereof which might result in a false command, owing to excitation of the circuit by the command signal itself.

The delayed impulse from the phototube is also passed to a gate generator 150. This generator provides a gating impulse whose width is variable in accordance with the command which it is desired to transmit, the width of the gate which can be set varying from one to seven intervals in length. The gating pulse is transmitted through line 151 to the gating circuit 152, and passes from one to seven impulses, as may have been selected, from the 1500 cycle trigger oscillator 135 through line 153 to a multivibrator pulse generator 155. The pulses so generated are transmitted through line 156 to the radio transmitter 157, operating on the frequency allotted to the flight level operated by the plane to be controlled, the transmitter radiating the signal to the plane from antenna 160.

All of the equipment shown in the diagram is, of course, duplicated for each altitude level.

Certain factors relating to the time of propagation of the signals which enter into the operation of the system should be discussed. The entire operation of the system is dependent upon the reception by the control station of the annunciator signal from the plane within the proper interval corresponding to the section. It is clear that there will be a material difference in relative time of transmission of the annunciator signal within the interval as between a plane in section 1 and a plane in section 100, this difference in epoch of emission being due to the time required for a coincidence pulse from station A to travel fifty miles or so down the airway. There will also be minor differences in relative time of receipt and transmission of the annunciator signals as between planes flying at high and low levels, and also as between planes in inner and outer courses, or near the center or ends of the courses.

It is for this reason that it is preferable to locate the control station at the end of the course most distant from the master station A. In this case a plane receives its triple coincidence in a time, following the emission of the pulse from the master station, which is dependent upon the distance of the plane from that station. Responsive to the triple coincidence the plane sends its own annunciator signal on down the course to the control station. Since both signals are transmitted in the same general direction, the longer the period before the plane receives its triple coincidence, the shorter will be the time required for its own signal to reach the control station.

If the control station were located adjacent the master station A, a cumulative delay between the transmision of the interval pulse from A and the reception by the control station of the annunciator pulse would be of the order of a very few microseconds, while if the plane were at the far end of the course the total difference in delay is only of the order of some twenty-nine or thirty microseconds, or less than five percent of the interval. Accordingly, there will remain within the interval ample time for the circuits to operate, and, if desired, to transmit to different altitudes by time division methods instead of by frequency separation as is here suggested. Once the various codes have been initiated, however, the need for extreme accuracy vanishes, since an entire interval is allotted to each element of the various codes proposed.

It will be understood that the system here described is capable of almost endless variations in detail, all of which are included within the spirit of the invention. Among those most likely to be included in the system as actually employed are the use of extra sections on each lane; e. g., even though the divisions remained a nominal fifty miles long, the time divison might be adapted to five sixty-mile divisions instead of six fifty-mile divisions, and the "spare" ten mile section points used for curves, holding courses, fly-back time for scanning generators, or other time consuming operations either on the plane or at the control station. The possible designation of alternate courses in opposite directions has already been referred to. There are many alternative ways of performing the functions of almost every element of the system. Therefore, I do not wish to be restricted to the organizations of apparatus, nor the sequences of operation detailed herein, but rather to obtain protection as broad as is defined by the following claims.

I claim:

1. An air-borne navigational and control instrument for use in a system wherein cyclic series of characteristic radio signals are transmitted from three geographically separated positions at time intervals such that successive signals within each cycle will arrive coincidentally at successive sections along a traffic lane, said instrument comprising radio receiver means receptive to a plurality of different characteristic signals, means associated therewith for detecting a triple coincidence of said signals, a radio transmitter, and means responsive to the detection of such triple coincidence for actuating said transmitter to produce at least one pulse, whereby the timing of said pulse within said cycle is indicative of the position of said instrument along said lane.

2. An instrument in accordance with claim 1 including means for generating identifying code pulses following said position identifying pulse.

3. An instrument in accordance with claim 1 including a barometer, and means controlled thereby for varying the characteristics of the pulses transmitted by said instrument.

4. An instrument in accordance with claim 1 including a barometer, and means controlled thereby for varying the frequency on which said pulse is transmitted.

5. An instrument in accordance with claim 1 including means responsive to a triple coincidence for sensitizing said receiver means to signals of different characteristics from those registering said coincidence.

6. An instrument in accordance with claim 1 including means responsive to a triple coincidence for sensitizing said receiver means to signals of different characteristics from those registering said coincidence for a limited period extending over the times of arrival of coinciding signals at a predetermined number of succeeding sections along said lane.

7. An instrument in accordance with claim 1 including means responsive to a triple coincidence for sensitizing said receiver means to signals of different characteristics from those registering said coincidence for a limited period extending over the times of arrival of coinciding signals at a predetermned number of succeeding sections along said lane, registering means responsive to said different signals, and means for clearing said registering means after a predetermined interval.

8. An instrument in accordance with claim 1 including means responsive to a triple coincidence for sensitizing said receiver means to signals of different characteristics from those registering said coincidence for a limited period extending over the times of arrival of coinciding signals at a predetermined number of succeeding sections along said lane, registering means responsive to said different signals, and means for clearing said registering means responsive to the reception of a succeeding triple coincidence.

9. In a flight control and monitoring system adapted for use in conjunction with a radio navigating system wherein successive timed signals of a series transmitted within a cycle of operation define successive positions along an airway, a radio receiver, a display surface laid out to depict said airway schematically, and means responsive to signals from said receiver and synchronized with said timed signals for registering the reception of said receiver signals on said display surface in positions thereon corresponding to the airway position defined by said timed signals in the epoch of said cycle of operation wherein said receiver signals occur.

10. Apparatus in accordance with claim 9 including means responsive to said receiver signals for transmitting a command signal in the interval preceding the next following position defining signal.

11. In a flight control and monitoring system adapted for use in conjunction with a radio navigating system wherein successive timed signals of a series transmitted within a cycle of operation define successive positions along an airway, a radio receiver, a cathode ray tube including an electron gun, a fluorescent screen and means for modulating the flow of electrons to said screen from said gun in response to signals from said receiver, and means synchronized with said position defining signals for deflecting said flow of electrons across said screen in a path schematically depicting the courses of aircraft along said airway, whereby a signal triggered by said position defining signals will indicate by modulation of said flow the position of an airplane on said airway.

12. Apparatus in accordance with claim 11 including a photocell, means for positioning said photocell to receive light from a selected portion of the cathode ray path, means for screening said photocell from light from other portions of said cathode ray path, whereby only modulations of said ray occurring at said path affect said photocell, a radio transmitter, and means actuated by said photocell for triggering said transmitter to send a preselected signal.

13. The method of monitoring and controlling an airway which comprises the steps of initiating from a plurality of positions adjacent said airway a cyclic series of radio signals timed to arrive coincidentally at successive sections along said airway, detecting the occurrence of a coincidence of said signals, initiating a radio pulse at the position of reception of said coincidence, receiving said pulse at a control point adjacent said airway and activating in response to said pulse, a visual display positioned in accordance with the phase of said pulse in the cycle to represent schematically the section of said airway whereat said coincidence was received.

14. The method in accordance with claim 13 which includes the step of initiating in response to said received pulse a coded command comprising one or more radio pulses transmitted within a predetermined number of time intervals synchronized with the timing of said first-mentioned series of signals.

15. The method in accordance with claim 13 which includes the step of initiating in response to said received pulse a coded command comprising one or more radio pulses transmitted within a predetermined number of time intervals synchronized with the timing of said first-mentioned series of signals, receiving said command pulses in the section of occurrence of said coincidence, and causing said command pulses to trigger response pulses to indicate the reception of such command.

16. The method in accordance with claim 13 which includes the step of initiating, in non-successive cycles, coded identifying pulses following said previously-mentioned pulse, and activating in response to said identifying pulses visual displays corresponding to the code transmitted.

17. The method in accordance with claim 13 which includes the steps of initiating a coded series of radio command pulses from said control point in response to the reception of said first mentioned pulse, and causing said command pulses to initiate a responding signal from the position wherein said coincidence occurred.

18. The method in accordance with claim 13 which includes the steps of initiating a coded series of radio command pulses from said control point in response to the reception of said first mentioned pulse, causing said command pulses to initiate a responding signal from the position wherein said coincidence occurred, and activating a visual display at said command point in response to the reception of said responding signal.

19. The method in accordance with claim 13 which includes the steps of initiating a coded series of radio command pulses from said control point in response to the reception of said first mentioned pulse, receiving said coded series at the position of reception of said coincidence, and causing said coded pulses to activate a visual display in accordance with the code transmitted.

20. An instrument in accordance with claim 1 including means responsive to a triple coincidence for sensitizing said receiver means to signals of different characteristics from those registering said coincidence, means for counting pulses of said different characteristics, and means for registering a signal depending on such count.

21. An instrument in accordance with claim 1 including means responsive to a triple coincidence for sensitizing said receiver means to signals of different characteristics from those registering said coincidence, means for counting pulses of said different characteristics, and means for transmitting a responding signal dependent on the number of pulses counted.

LUIS W. ALVAREZ.

REFERENCES CITED

The following references are of record in the file of this patent:

UNITED STATES PATENTS

| Number | Name | Date |
| --- | --- | --- |
| 2,027,527 | Hamond | Jan. 14, 1936 |
| 2,312,203 | Wallace | Feb. 23, 1943 |
| 2,402,688 | Skurnic | June 25, 1946 |
| 2,405,238 | Seeley | Aug. 6, 1946 |
| 2,408,048 | Deloraine et al. | Sept. 24, 1946 |
| 2,421,017 | Deloraine et al. | May 27, 1947 |
| 2,422,100 | Huff | June 10, 1947 |
| 2,436,805 | Hoffman | Mar. 2, 1948 |
| 2,444,426 | Busignies | July 6, 1948 |
| 2,444,445 | Ibister | July 6, 1948 |
| 2,448,016 | Busignies | Aug. 31, 1948 |
| 2,449,977 | Busignies | Sept. 28, 1948 |
| 2,458,361 | Field et al. | Jan. 4, 1949 |